Aug. 29, 1950     A. A. ZUEHLKE     2,520,872
FLUSH-TYPE BULB FOR THERMOSENSITIVE TUBE SYSTEMS
Filed Feb. 11, 1949
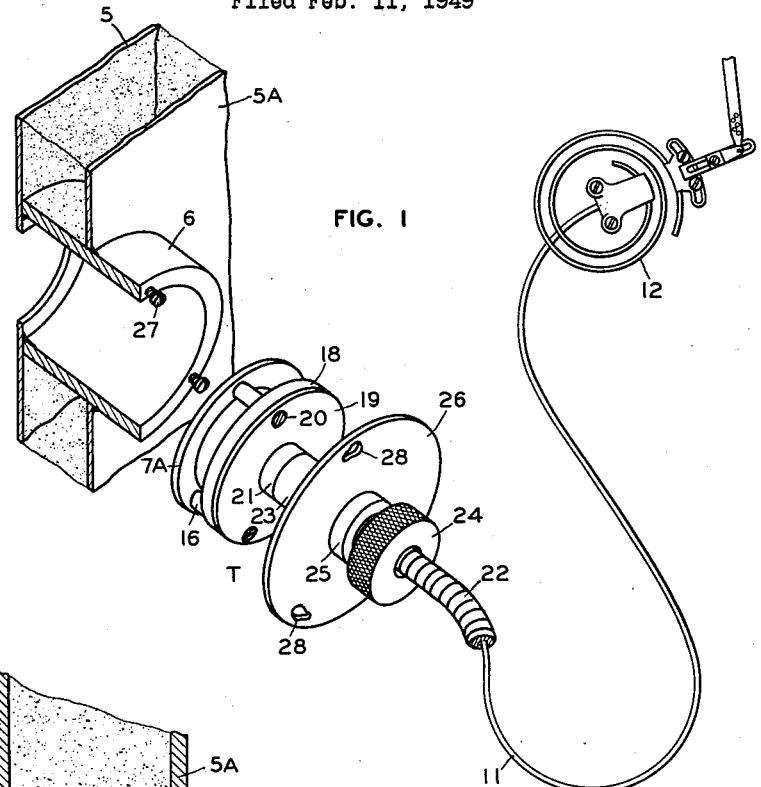
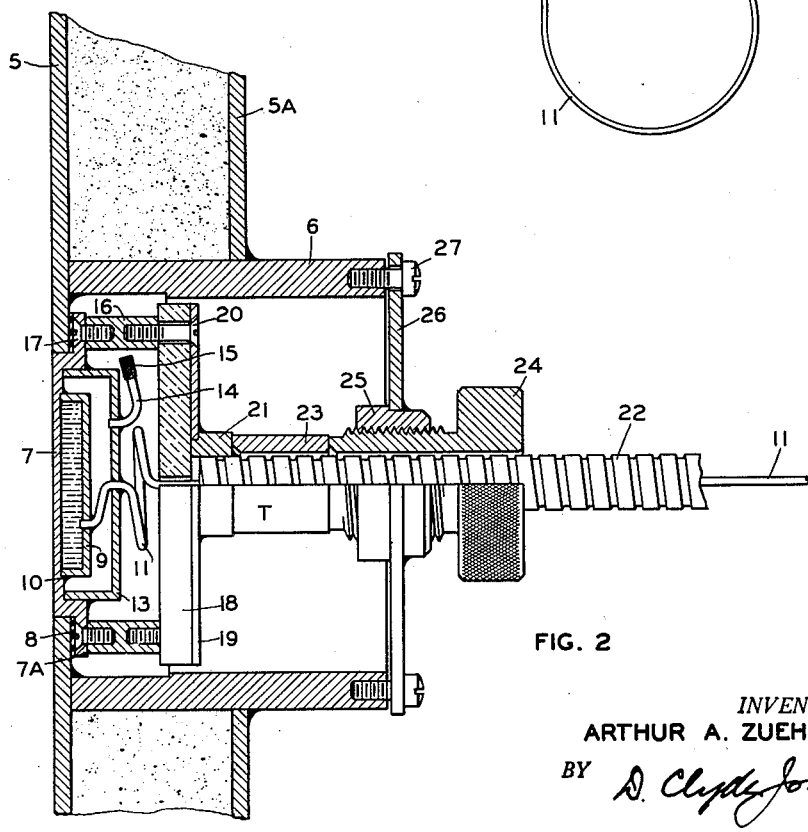
*INVENTOR.*
ARTHUR A. ZUEHLKE
BY D. Clyde Jones
ATTORNEY Patented Aug. 29, 1950

2,520,872

UNITED STATES PATENT OFFICE 2,520,872

FLUSH-TYPE BULB FOR THERMOSENSITIVE TUBE SYSTEMS

Arthur A. Zuehlke, Rochester, N. Y., assignor to Taylor Instrument Companies, Rochester, N. Y., a corporation of New York Application February 11, 1949, Serial No. 75,918

4 Claims. (Cl. 73—369)

This invention relates to a thermosensitive tube system having a flush type bulb and to a mounting for said bulb.

In the processing of many products, notably foods, it is customary to employ a stainless steel tank provided with stirring mechanism to keep the product agitated while it is being heated. In addition, the interior of the tank must be frequently scrubbed. Both of these conditions make it highly desirable that no part of the thermosensitive element project into the tank. However, flush type thermosensitive elements have been notoriously sluggish in responding to changes in temperature. This is due mainly to the fact that a major portion of the area of a thermosensitive flush-type element is not directly exposed to the heated product with the result that the heat transfer to the responsive medium in the element is greatly retarded as compared with conventional thermosensitive elements which are immersed in the heated product. Furthermore, there are losses of transferred heat from that portion of the element which is not immersed in the heated product. Also that the portion of the flush type element in contact with the product is preferably made of stainless steel for the same reasons that the tank is made of stainless steel, namely, because it is non-corrosive and does not contaminate the product. However, stainless steel does not conduct heat readily.

In accordance with the present invention, there is provided a flush type thermosensitive element filled with a thermoresponsive medium which element is equipped with means to facilitate the transfer of heat from the product to the medium and to prevent, in large part, the loss of transferred heat.

The various features and advantages of the invention will appear from the detailed description and claims when taken with the drawings in which:

Fig. 1 illustrates a thermoresponsive instrument having its thermoresponsive element positioned in readiness to be inserted in a wall of the tank, only a fragment of which is shown, and Fig. 2 is a sectional view of a portion of the thermoresponsive element shown flush mounted in a wall of the talk only a part of which is illustrated.

Referring to the drawings, the numerals 5 and 5a designate the walls of a tank which are preferably made of stainless steel. The walls of the tank have an opening therein enclosed by a cylindrical collar 6 sealed to said walls as by welding, to provide a housing for a thermoresponsive element generally designated T. The element T in its preferred form comprises a capsule to contain a thermoresponsive fluid. The front wall of the capsule comprises a plate 7 of a size to make a flush fit in the opening in the tank wall 5. The margin 7A of the plate is offset to overlap the rear surface of the tank wall 5 with a gasket 8 between the overlapping parts to provide a fluid tight seal when the overlapping parts are forced together. The side and rear walls of the capsule comprise a cup 9 having its rim sealed at 10 to the rear surface of the plate 7 as by welding. The cup is preferably made from copper or other material having good heat conducting properties. The capsule communicates with a capillary tube 11 which in turn communicates with a pressure responsive device 12 (Fig. 1) such as a Bourdon spring, to provide what is known in the arts as a thermal tube system. This tube system is filled with a fluid which actuates the device or Bourdon spring 12 in response to changes in temperature at the element T. The Bourdon spring winds up or unwinds in response to temperature changes to actuate an index and/or a temperature control means (not shown).

Since the cup 9 is made of good heat conducting material, its temperature will tend to assume promptly the temperature of plate 7. This has the effect of increasing the rate of heating of the fluid within the cup thereby improving the response rate of the thermal system and of bringing the temperature of the fluid in the capsule to that of the tank wall temperature so that temperature errors are reduced.

In accordance with the present invention a second cup or shield 13 is mounted concentrically around cup 9 with the rim of cup 13 sealed to the rear surface of the plate 7 thereby defining a chamber. Cup 13 is also made of a highly conducting material such as copper and also tends to assume the temperature of plate 7 quickly. The cup 13 and the mentioned chamber prevent the loss of radiated heat from cut 9 and therefore insure that cup 9 and the fluid therein will be at the temperature of plate 7. As a result of this, the fluid contained therein will accurately measure the temperature of the contents of the tank. As herein illustrated the chamber is evacuated through an exhaust tube which is sealed at 15. It will be understood that the chamber instead of being evacuated, can be filled with heat insulating material.

It has been mentioned that margin 7 of the plate 7 is forced against the gasket to make a liquid-tight seal with the wall 5 of the tank.

While this seal may be effected in various ways, it is herein effected by the following means. Internally threaded posts 16, of which three are employed, are fastened by screws 17 to margin 7A to project rearwardly therefrom. A circular sheet 18 of acid-digested asbestos impregnated with a substantially odorless synthetic resin (now sold under the trade name "Haveg"), is mounted on the right ends (Fig. 1) of posts 16. This sheet substantially closes the opening in collar 6. The mounting of sheet 18 comprises a rigid metal plate 19 coextensive with said sheet, and screws 20 passing through these parts into the threaded rear ends of the posts 16. The sheet 18 and the plate 19 are centrally apertured so that capillary tube 11 can pass therethrough. The plate is provided with an attached collar 21 surrounding the aperture therein. A section of protective armor 22, which encloses a portion of the capillary tube, has its left end (Fig. 2) terminating within the collar 21. Sleeve 23 surrounding the armor 22, is engaged at its right end by a hollow adjusting nut 24 which is mounted to force the margin 7A of the temperature responsive element T against the gasket 8 and against the rear surface of the tank wall 5. The adjusting nut 24 encircles the armor and is threaded to engage the internally threaded bushing 25. The bushing 25 is secured in a central opening in a rigid disc 26. This disc is fastened by screws 27 passing through openings 28 in the margin of the disc 26 and threaded into the free edge of the collar 6. Preferably the openings 28 are in the form of key-hole slots so that the disc 26 and the adjusting nut 24 can be removed from the collar 6 without unscrewing the screws 27.

While the preferred form of the present invention has been illustrated, it will be understood that various changes and modifications therein can be made within the scope of the appended claims, without departing from the spirit of this invention.

What I claim is:

1. A device for indicating the temperature of the contents of a tank having an opening in the wall thereof, said device comprising a hollow element containing a thermoresponsive medium and indicating means actuated in response to changes in pressure of said medium, said element having a face plate adapted to be sealed in said opening with its front surface substantially flush with the inner surface of said tank wall and a cup-shaped member having its rim sealed to the margin of said plate, the material of the cup-shaped member having superior heat conducting properties with respect to that of said plate.

2. A device for indicating the temperature of the contents of a tank having an opening in the wall thereof, said device comprising a hollow element containing a thermoresponsive medium and indicating means actuated in response to changes in pressure of said medium, said element having a face plate adapted to be sealed in said opening with its front surface substantially flush with the inner surface of said tank wall and a cup-shaped member having its rim sealed to the margin of said plate, the material of the cup-shaped member having superior heat conducting properties with respect to that of said plate, and heat insulating means at the outside surface of said cup tending to prevent dissipation of heat therefrom.

3. A device for indicating the temperature of the contents of a tank, said device comprising a hollow element containing a thermoresponsive medium and indicating means actuated in response to changes in pressure of said medium, said element having a face plate adapted to be sealed in an opening in the wall of a tank with the front surface of the plate substantially flush with the inner surface of said tank and a cup-shaped member having its rim sealed to the margin of said plate, the material of the cup-shaped member having good heat conducting properties, and an evacuated chamber substantially enclosing said member.

4. A device for indicating the temperature of the contents of a tank having an opening in the wall thereof, said wall being made of non-corrosive material having relatively poor heat conducting properties, said device including an element containing a thermoresponsive medium for sensing the temperature of substances contained in said tank, said element comprising a bulb containing said medium and having a face of non-corrosive material sealed in said opening in substantially flush relation with the inner surface of said tank wall, a substantial portion of the remainder of said bulb being made of a material having considerably better heat conducting properties than those of said face, a member sealed to said portion to define therewith an evacuated chamber, said member comprising a material having heat conducting properties superior to those of said face.

ARTHUR A. ZUEHLKE.

REFERENCES CITED

The following references are of record in the file of this patent:

UNITED STATES PATENTS

| Number | Name | Date |
| --- | --- | --- |
| 1,294,165 | Reese | Feb. 11, 1919 |
| 1,605,153 | Weir | Nov. 2, 1926 |
| 1,724,528 | Springer | Aug. 13, 1929 |
| 1,931,238 | Phelan | Oct. 17, 1933 |